May 6, 1941. H. O. HEM 2,241,348
WEIGHING SCALE
Filed Aug. 18, 1938 2 Sheets-Sheet 1
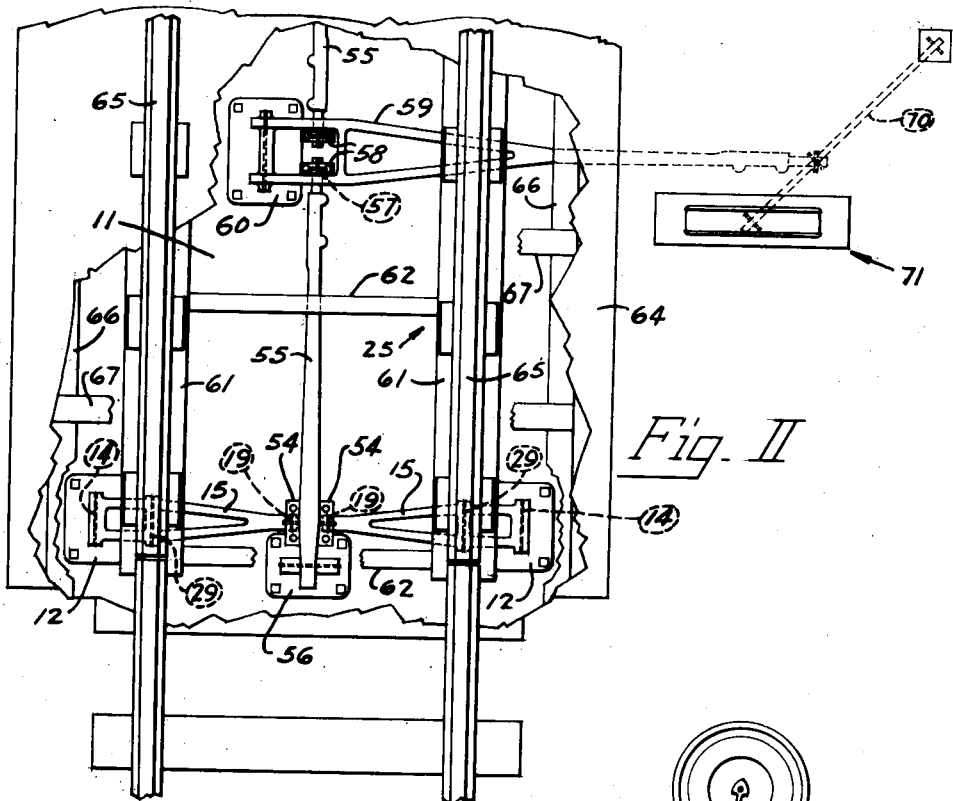
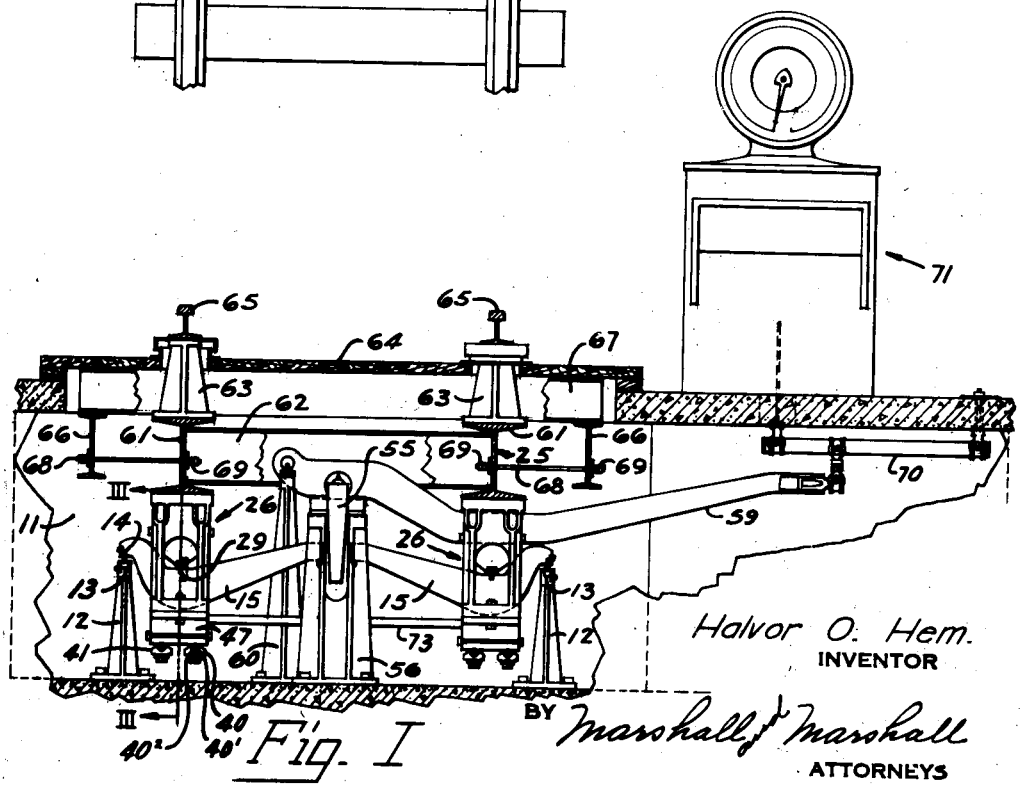
Halvor O. Hem.
INVENTOR
BY Marshall & Marshall
ATTORNEYS

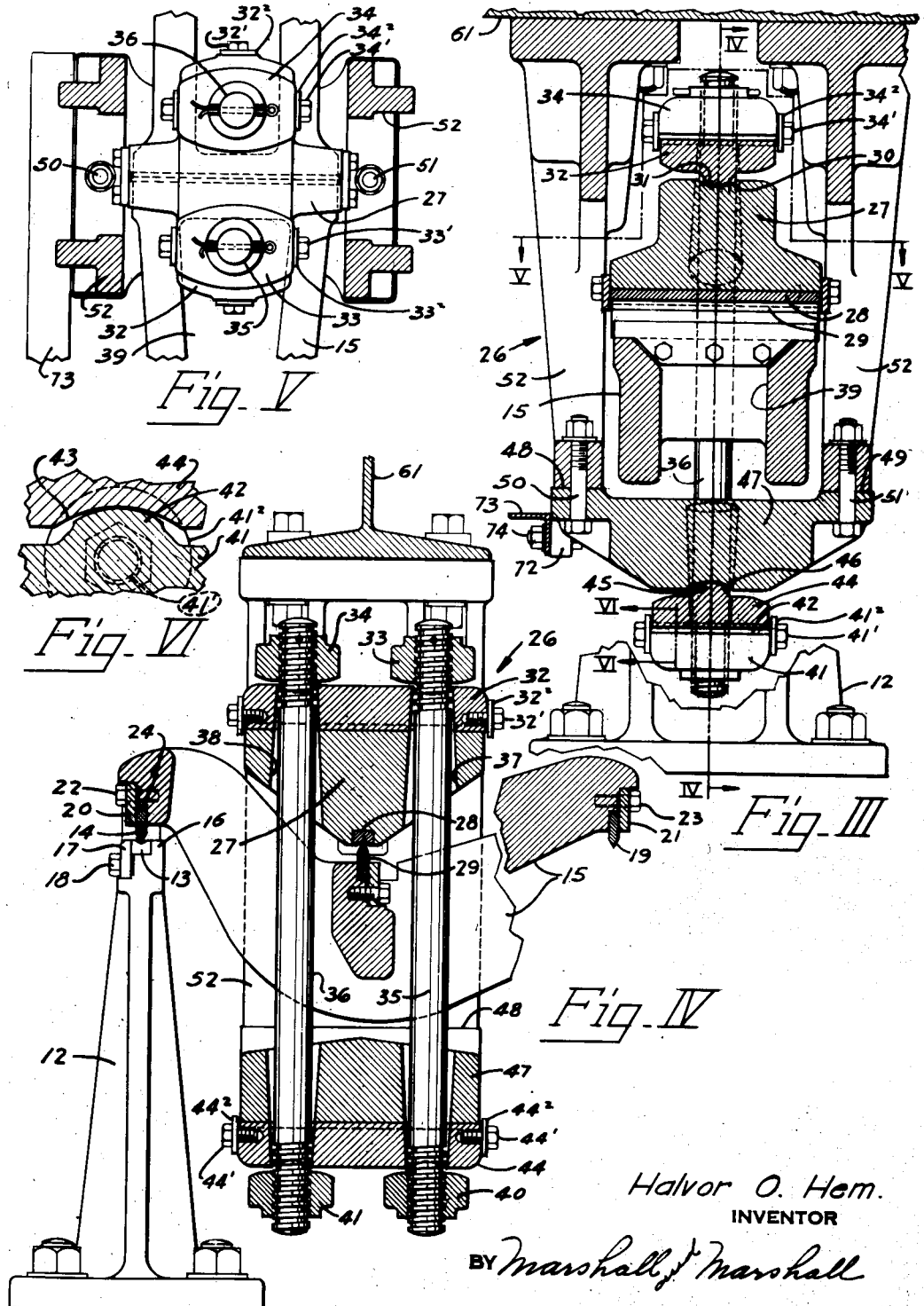

Patented May 6, 1941

2,241,348

UNITED STATES PATENT OFFICE 2,241,348

WEIGHING SCALE

Halvor O. Hem, Toledo, Ohio, assignor to Toledo Scale Company, a corporation of New Jersey Application August 18, 1938, Serial No. 225,606

3 Claims. (Cl. 265—71)

This invention relates generally to weighing scales, and more particularly to improvements in scales designed to weigh comparatively heavy loads, such as railway rolling stock, motor trucks, etc. In scales of this character the load is usually moved onto the platform or rails mounted upon a platform frame from the side and in order to relieve the pivots and bearings from excessive strain it is desirable to so support the platform frame that it may move or yield laterally when a car is moved upon it. It is also imperative for correct weighing that the platform frame return absolutely to its normal position relative to the lever mechanism after each lateral swinging movement.

One of the principal objects of the invention is to provide improved means for so supporting a load receiving frame upon the lever mechanism that the platform shall have free swinging movement in all directions without rocking of the scale pivots in their bearings.

Another object is to support the platform frame in a manner which allows deflection of its component parts without resulting in an "out of plumb" or other injurious condition of the weighing mechanism.

Still another object is the provision of improved means for mounting pivots and bearings whereby friction is obviated to a large extent.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a side elevational view of a railway scale embodying the invention, portions being broken away and parts sectioned.

Fig. II is a plan view thereof, a portion of the deck construction being broken away to more clearly show the lever mechanism.

Fig. III is an enlarged end elevational view of the platform bearing suspension, it being sectioned substantially along the line III—III of Figure I.

Fig. IV is an enlarged side elevational view of the platform frame suspension, sectioned substantially along the line IV—IV of Figure III.

Fig. V is an enlarged fragmentary plan view of the platform frame suspension, sectioned substantially along the line V—V of Figure III; and, Fig. VI is an enlarged fragmentary detailed view of the yoke supporting rocker, sectioned along the line VI—VI of Figure III.

Referring to the drawings in detail:

In the construction of scales according to the invention, for weighing heavy loads such as railway rolling stock, motor trucks, etc., the load supporting levers may be arranged in several different ways and combinations; therefore, the lever arrangement shown and described herein is illustrative only.

In the pit 11, of heavy concrete construction, are mounted a series of lever fulcrum stands 12. Each of these stands 12 carries in its upper end a hardened steel bearing block 13 upon which a fulcrum pivot 14 of load receiving lever 15 is rockably seated. To simplify the manufacturing operations of the stand, and at the same time enhance the accuracy of the scale, the bearing block 13 is mounted in a carefully machined seat in the upper end of the fulcrum stand. These bearing blocks, which are of substantial length, support the entire weight of the load on the scale as well as the major portion of the dead weight of the scale levers and the load receiving means, and unless they are carefully seated and rigidly clamped in place are apt to become distorted and thus through excessive friction cause erroneous weight indications. To avoid any possibility of such distortion in the instant invention, after careful machining and hardening, each of the blocks is clamped against a shoulder 16 on the stands 12 by the cooperation of clamping plates 17 and bolts 18. For the same reason the fulcrum pivots 14, as well as the nose pivots 19, are secured to the levers 15 by similar clamping plates 20, 21 and bolts 22, 23 respectively. Pivots and bearing blocks, such as used in heavy capacity scales, are relatively long and are very apt to warp somewhat during the hardening operation. This warping has no effect on the accuracy of the scale since the knife edge of the pivot and the apex of the V in the bearing block are ground after hardening and since in the grinding operation the parts are located in the fixture from that side which in the assembly of the parts in the levers and stands abuts against the fixed shoulder of the levers and the stands, the contact edges are all parallel to each other. Any irregularity due to warping in the hardening operation is evident on the clamping side. When clamped by wedge-like means or by a series of bolts passing directly through the body of the pivots, as heretofore customary, any variation in the parallelism of the sides of these pivots and bearings may cause their knife edges or V's to distort. This distortion, although never more than a few one-thousandths of an inch, nevertheless causes unequal wear on the pivot edges and bearings and thus causes friction which, due to the high multiplication of the lever system, results in substantial errors in the indication of the weight.

The clamping plates 20 and 21 in the instant invention are of such thickness and rigidity and the bolts 22, 23 are so placed in respect to the clamping surface that sufficient clamping pressure may be exerted against the sides of the pivots to hold these pivots and/or bearings rigidly in place yet allow them to align themselves by slightly flexing to any slight variation in the parallelism of the body of the pivot or bearing.

It is a well known fact that in any scale the pivot edges must be maintained in a sharp condition. This requires regrinding of the knife edges or honing, but in either case the pivot is bound to become somewhat shorter, decreasing the so-called range of the pivots. Heretofore it was necessary to replace the pivots after a number of sharpening operations. In levers, however, which are equipped with pivots according to the invention such replacement is not necessary. When the pivots become shorter, due to grinding or honing, shims 24 (Fig. IV), comprising very thin metallic strips, may be placed between the pivot body and the shoulder in the lever against which it abuts. This results in a substantial saving since the levers may be reconditioned without removing them from the pit.

In heavy capacity scales in which the platform, or other load receiving means are mounted on a lever system comprising several sections, it is essential that the distance between the fulcrum and the nose pivots of these levers 15 be exactly equal. In the present invention, the seats for the pivots 14 and 19 may be machined in a double-end milling machine which assures accuracy.

It is one of the objects of this invention to so support the load receiving means on the levers that after any movement imparted to a load receiving frame 25, by a force acting laterally against it, the load receiving frame 25 returns by the action of gravity to its original position after the removal of the force. This is accomplished by an improved platform suspension hanger 26. This hanger 26 comprises a saddle block 27 provided with a hardened bearing 28 rockably mounted upon a load pivot 29 clamped in the lever 15. The upper portion of the saddle block 27 (Fig. III) is provided with a laterally extending bearing groove 30 for the reception of a cylindrical pivot ridge 31 on a rocker member 32. The upper face of this rocker member 32, whose length is equal to the width of the saddle block 27, is provided with two bearing grooves in its upper face which are spaced from each other and in these grooves are seated cylindrical projecting pivot ridges of rocker members 33 and 34. The rocker members 33 and 34 are bored, and threaded into these bores are suspension rods 35 and 36 which are parallel to each other and pass through aligned tapered holes 37 and 38 in the rocker member 32, the saddle block 27 and through a bifurcation 39 of the rear or butt end of the lever 15. These rods 35 and 36 are spaced one on each side of the load pivot 29 and straddle this pivot as well as its clamping means. The lower end of the rods 35 and 36 are threaded into rocker members 40 and 41 which are similar to the rockers 33 and 34 and cylindrical ridges 42 engage bearing grooves 43 in a rocker 44 which performs a function similar to that of rocker member 32. This rocker 44 is also provided with a pivot ridge 45 which is received in a bearing groove 46 in a supporting bracket 47. This supporting bracket 47 is provided with parallelly extending surfaces 48 and 49 which extend beyond the sides of the bifurcated end of the lever 15 and support downwardly extending legs of yoke 52 of the suspension hanger 26. These downwardly extending legs are securely bolted to the plate 47 by bolts 50 and 51 which pass through aligned openings in the aforesaid members. The members 32, 33, 34, 40, 41 and 44 are provided with holes into which bolts 32', 33', 34', 40', 41' and 44' respectively are threaded which clamp steel washers $32^2$, $33^2$, $34^2$, $40^2$, $41^2$ and $44^2$ in such a manner to the ends of the aforementioned rockers so as to prevent relative endwise movement.

The lever system, shown in Figures I and II, is a two-section railway scale, each section comprises a pair of fulcrums stands 12, a pair of levers 15 which are fulcrumed on the stands 12 and whose nose pivots are connected by means of stirrups 54 to a long transmission lever 55 which is mounted by means of suitable pivots on a fulcrum stand 56 and a nose pivot 57 of the transmission lever 55 by means of a stirrup 58 is pivotally connected to an extension lever 59 which is mounted parallelly to the levers 15. This extension lever is fulcrumed on a stand 60. The levers are so positioned in the pit 11 that the suspension hangers 26, which are mounted upon the load pivots 29 of the levers 15, support the corners of the load supporting frame 25. This load supporting frame 25 consists of two longitudinally extending I beams 61 and a plurality of cross beams 62 which are securely bolted or welded together.

In the embodiment shown, a series of rail chairs 63 are securely mounted on the longitudinally extending I beams which project upwardly through apertures in a stationary deck 64. These rail chairs 63, in the usual manner, support rails 65. To support the deck 64 I beams 66, whose ends are embedded in the end walls of the pit, are provided and a series of transverse beams 67 are mounted in spaced relation to each other on the beams 66. Rods 68, provided with nuts 69 on each end, pass loosely through apertures in the deck beams 66 and the longitudinal load supporting frames 61 and form check links. These check rods 68 are provided only for emergencies as it is obvious that the improved hanger construction is well able to absorb and recover from lateral and longitudinal platform movements. The free end of the lever 59, by means of suitable pivots and stirrups, is connected to another extension lever 70 which is provided for two purposes, namely to modify the multiplication of the lever system and to permit a cabinet 71, containing the load counterbalancing mechanism and indicating means, to be placed in any desired position.

Although not absolutely necessary, it is sometimes desirable in large lever systems to connect the lower ends of the suspension hangers at each end of the load supporting frame, the yokes being connected by the load supporting frame. For this purpose the supporting brackets 47 are each provided with a downwardly projecting boss 72 to which the end of an angle iron tie 73 is fastened by means of bolts 74.

From the aforegoing it is obvious that the arrangement of the members forming the hanger 26 permit the platform to rock universally without rocking the bearings 28 on the pivots 29 and when the force acting on the platform is removed the hangers 26 will again assume their original plumb position. It should also be obvious that the improved manner in which the pivots are held in the levers fully fulfill the objects primarily stated but it must be understood that although the invention is shown embodied in one type of scale mechanism only that it is susceptible to variation, modification and change within the spirit and scope of the subjoined claims.

Having described the invention, I claim:

1. In a weighing scale, in combination, a lever having a bifurcated portion, a load pivot extending laterally across said bifurcated portion, a saddle block arranged to engage said pivot and having a transversely arranged bearing groove on its upper face, a rocker member having a pivot ridge engaging said bearing groove substantially along its entire length, spaced parallel bearing grooves in the upper face of said rocker member and extending transversely to said pivot ridge and a pair of rocker members having pivot ridges for engaging said spaced parallel grooves formed upon said first mentioned rocker member, aligned holes in said rocker members and said saddle block, rods threaded into the uppermost of said rocker members and extending downwardly through said aligned holes and through said furcation of said lever, a rocker member secured to the lower end of each of said rods and having pivotal ridges, a transversely extending rocker member having bearing grooves engaged by said pivotal ridges and provided with a pivotal ridge on its opposite face, a bracket having a bearing groove for engaging substantially the entire length of said pivotal ridge mounted upon said last mentioned rocker member and a load supporting yoke mounted upon said bracket and adapted to support a load supporting frame, said rocker members engaging said saddle block and said bracket having thrust means to prevent disengagement of said rocker members and said members engaged by them.

2. In a weighing scale, in combination, a lever having a bifurcated portion, a load pivot extending laterally across said bifurcated portion and relatively resiliently clamped in a machined seat, a saddle block arranged to engage said pivot and having a transversely arranged bearing groove on its upper face, a rocker member having a pivot ridge engaging said bearing groove substantially along its entire length, spaced parallel bearing grooves in the upper face of said rocker member and extending transversely to said pivot ridge and a pair of rocker members having pivot ridges for engaging said spaced parallel grooves formed transversely upon said first mentioned rocker member, aligned holes in said rocker members and said saddle block, rods threaded into the uppermost of said rocker members and extending downwardly through said aligned holes and through said furcation of said lever, a rocker member secured to the lower end of each of said rods and having pivotal ridges, a transversely extending rocker member having bearing grooves engaged by said pivotal ridges and provided with a pivotal ridge on its opposite face and a bracket having a bearing groove for engaging substantially the entire length of said pivotal ridge, mounted upon said last mentioned rocker member and a yoke mounted upon said bracket and adapted to support a load supporting frame.

3. In a weighing scale, in combination, a lever having a load pivot extending laterally, a saddle block arranged to engage said pivot, a single rocker member pivoted transversely on said saddle block, a pair of rocker members pivoted parallelly on said first mentioned single rocker member, aligned holes in said saddle block and in said rocker members, a pair of rods threaded into said holes in said last mentioned rocker members and extending downwardly through said first rocker member and said saddle block, a rocker member secured to the lower end of each of said rods, a single rocker member pivotally engaged by the rocker members which are secured to the lower ends of said rods, a bracket transversely mounted upon said last mentioned rocker member and a platform supporting frame bolted to said bracket and adapted to support a load supporting member, said rods being parallel to each other and straddling said load supporting pivot.

HALVOR O. HEM.